United States Patent [19]

Wickramanayake

[11] Patent Number: 5,205,927
[45] Date of Patent: Apr. 27, 1993

[54] APPARATUS FOR TREATMENT OF SOILS CONTAMINATED WITH ORGANIC POLLUTANTS

[75] Inventor: Godage B. Wickramanayake, Columbus, Ohio

[73] Assignee: Battelle Memorial Institute, Columbus, Ohio

[21] Appl. No.: 561,474

[22] Filed: Aug. 1, 1990

Related U.S. Application Data

[63] Continuation-in-part of Ser. No. 101,049, Sep. 25, 1987, abandoned.

[51] Int. Cl.⁵ .................................................. C02F 1/78
[52] U.S. Cl. .................................... 210/170; 210/192; 210/206; 210/760; 55/256; 422/186.08; 422/186.12
[58] Field of Search ............... 210/747, 760, 170, 192, 210/198.1, 206, 221.2; 134/31, 42; 55/95, 244–255; 422/29, 186.07–186.12

[56] References Cited

U.S. PATENT DOCUMENTS

| | | | |
|---|---|---|---|
| 3,904,521 | 9/1975 | Stopka | 210/192 X |
| 4,021,338 | 5/1977 | Harkin | 210/747 |
| 4,167,973 | 9/1979 | Forte et al. | 210/170 X |
| 4,182,663 | 1/1980 | Vaseen | 210/760 |
| 4,204,955 | 5/1980 | Armstrong | 210/760 |
| 4,298,467 | 11/1981 | Gartner et al. | 210/192 X |
| 4,650,573 | 3/1987 | Nathanson | 210/192 X |
| 4,696,739 | 9/1987 | Pedreault | 210/192 X |
| 4,778,532 | 10/1988 | McConnell et al. | 134/31 |

*Primary Examiner*—Thomas Wyse
*Attorney, Agent, or Firm*—Klaus H. Wiesmann

[57] ABSTRACT

An apparatus for treating soil contaminated by organic compounds wherein an ozone containing gas is treated with acid to increase the stability of the ozone in the soil environment and the treated ozone applied to the contaminated soil in a manner adapted to decompose the organic compounds; one embodiment of the apparatus comprises a means to supply ozone as a gas-ozone mixture, a stability means to treat ozone obtained from the supply and distribution means to apply the stabilized gas-ozone to soil. The soil may be treated in situ or may be removed for treatment and refilled.

11 Claims, 3 Drawing Sheets

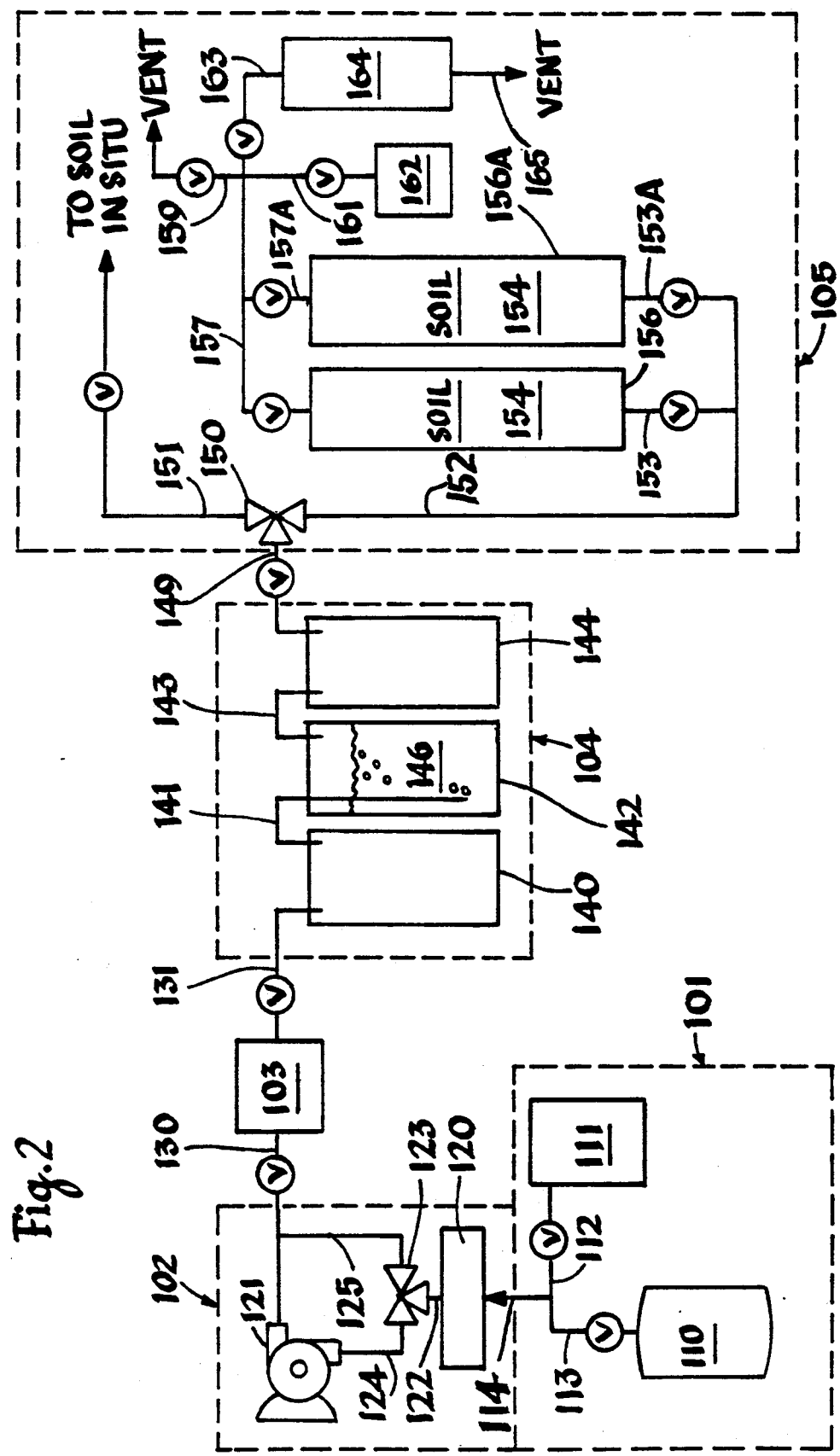

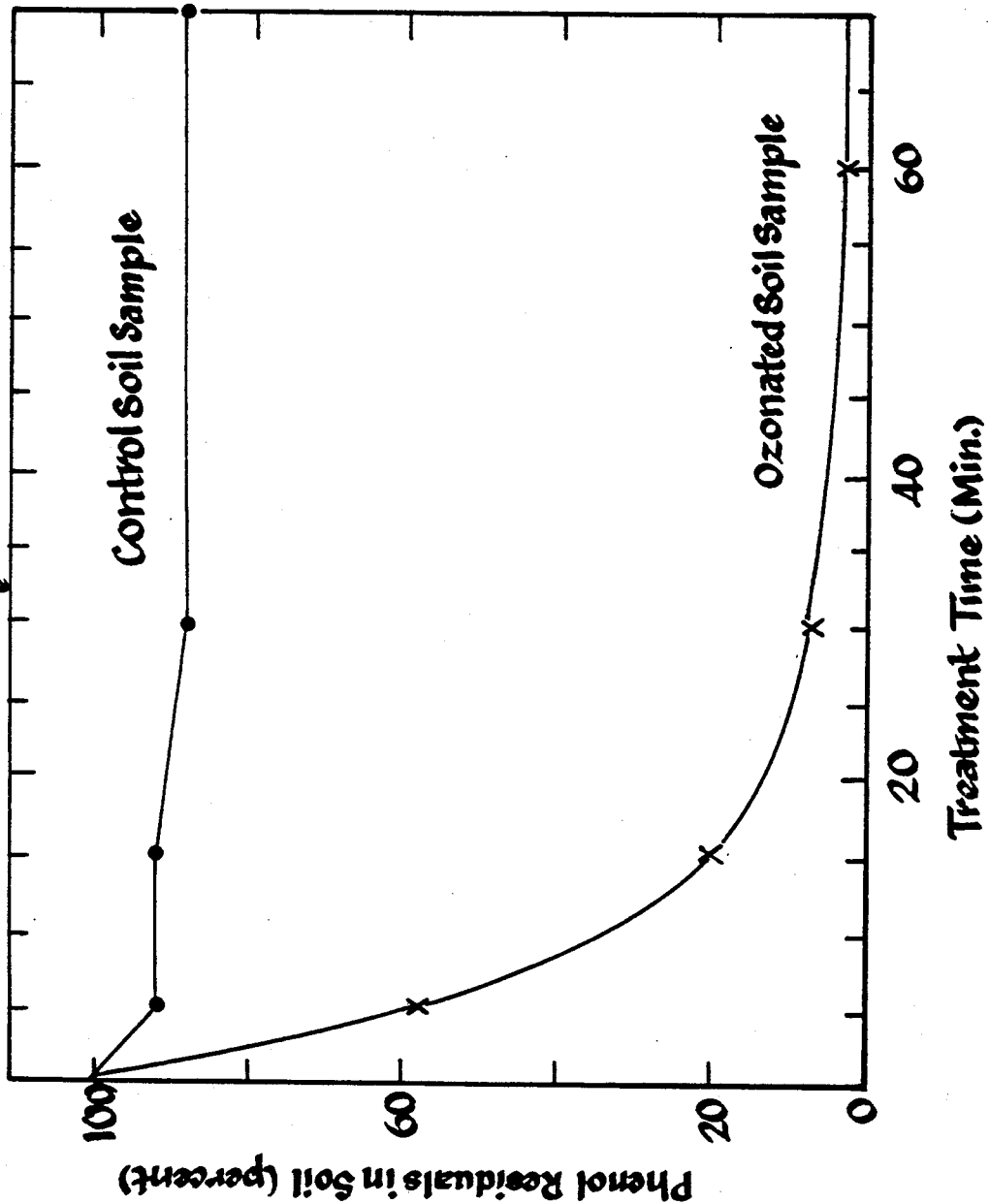
Fig. 3 Removal of Phenol in Soil by Ozonation

APPARATUS FOR TREATMENT OF SOILS CONTAMINATED WITH ORGANIC POLLUTANTS

This is a continuation-in-part of copending application(s) Ser. No. 07/101,049 filed on Sep. 25, 1987, abandoned.

FIELD OF THE INVENTION

This invention relates to an apparatus for treating soil contaminated with organic compounds. The apparatus has utility in treating the soil in situ without having to remove the soil from the site. The treatment results in degradation of the organic compounds to less hazardous compounds or compounds that are more readily biodegradable than the parent compound. The apparatus has particular utility in degrading organic compounds comprising unsaturated aliphatics, some alkanes and aromatics, and some of their halogenated compounds.

BACKGROUND OF THE INVENTION

Ozone is an allotropic form of oxygen containing three oxygen atoms per molecule. It is an extremely powerful oxidizing agent with the oxidation-reduction potential being 2.7 volts. Ozone reacts with a large number of organic compounds in aqueous and nonaqueous environments. Since ozone decomposes rapidly, its application in the destruction of organic waste is limited unless it is introduced continuously. The stability of aqueous ozone, however, can be improved by several methods which include lowering the solution pH or increasing the concentration of base in high pH environments. Ozone half-life values in 0.05 M phosphate buffer solutions at pH 4 and 10 are approximately 10,000 and 10 seconds, respectively. Hoigne and Bader; Hoigne, J., and Bader, H., 1983, Rate Constants of Reactions of Ozone with Organic and Inorganic Compounds in Water-I, Water Research, Vol. 17, pp. 173–183; reported that the addition of sodium bicarbonate and dimethyl mercury increased the stability of ozone at high pH. An increase in base (NaOH) concentration from 1 N to 20 N also results in the extension of the half-life of ozone by more than three orders of magnitude. However, such high base concentrations or application of chemicals such as methyl mercury are not practical for on-site treatment of contaminated soil.

In most of the previous work, ozone has been used to destruct or treat organic wastes present in aqueous media (U.S. Pat. Nos.: 2,703,247; 3,920,547; 4,029,578; 4,076,617; 4,098,691; 4,487,699; 4,537,599; 4,619,763; Japanese Patents: 4,500; 43,304). Application of aqueous ozone solutions to treat contaminated soil is difficult because of the relatively slow liquid permeation through soils and rapid decomposition of ozone. For example, if aqueous ozone is applied at a 2-atm/m pressure gradient to a soil having a permeability of 0.1 m/day (e.g., clay-loam soil), the liquid front will move only at a velocity of 0.16 m/hr. Because of these low flow velocities, practical value of aqueous ozone treatment of contaminated soils is very limited.

According to Hazen-Poiseulle's approach, if the pressure gradient is constant and the fluid compressibility is neglected, the velocity of a Newtonian fluid under capillary flow conditions is inversely proportional to the dynamic viscosity of the fluid. Then, under capillary flow conditions and ambient temperatures, air flow velocity is about two orders of magnitude (100 times) faster than that of water. The flow velocities of an ozone-oxygen or an ozone-air mixture are similar to air flow velocity. Because of rapid penetration, ozone gas, can be effectively used in soil decontamination provided the gas phase reactions can be established with organics in soils. To the knowledge of the inventor, there are no studies on the application of ozone gas to treat soils contaminated with hazardous organic wastes. According to a recent report published by the U.S. Environmental Protection Agency; U.S. Environmental Protection Agency, 1985, Remedial Action at Waste Disposal Sites (Revised), EPA/625/6–85/006, Office of Emergency and Remedial Response, U.S. EPA, Washington, D.C. pp. 9–53; "Ozone is used in the treatment of drinking water, municipal wastewater, and industrial waste, but has never been used in the treatment of contaminated soils or groundwater". This indicates that ozone, either in aqueous or gas phases, has not been used for soil decontamination. In the present invention, a pretreated gas-ozone mixture was used to decontaminate soils containing hazardous organic wastes.

It is an object of the present invention to stabilize gaseous ozone in the soil environment. It is a further object of the invention to stabilize the gaseous ozone in an efficient and cost effective manner. A further object of the invention is the efficient and expeditious decontamination of soil. Another object of the invention is to allow the in situ treatment of contaminated soil.

SUMMARY OF THE INVENTION

The invention provides a process and apparatus for the treatment of soil contaminated with organic pollutants. The process includes the steps of providing a supply of a gas-ozone mixture, treating the gas-ozone mixture with acid in a manner to promote the stability of ozone in the mixture, and applying the stabilized gas-ozone mixture to soil contaminated with organic compounds that are susceptible to reaction with ozone. The soil may be treated in situ or excavated and treated in a chamber. If in situ application is contemplated one or a plurality of wells may be drilled in the contaminated soil and the gas-ozone mixture injected in the wells. A final neutralizing step may be included where a neutralizing chemical reacts with residual ozone remaining in the gas mixture prior to allowing the gas to vent to the atmosphere.

A general description of the apparatus useful for producing the stabilized gas-ozone mixture for treating soil contaminated with organics includes at least an ozonator (ozone generators adapted to receive an oxygen containing gas from a gas supply means, that generates ozone from oxygen in the gas to produce a gas-ozone mixture and ozone stabilizing means adapted to receive the gas-ozone mixture from the ozone generator and stabilize the mixture by contacting the mixture with an acid to produce a stabilized gas-ozone mixture. In another embodiment the apparatus may include gas supply means adapted to supply gas containing oxygen to an ozone generator, and distribution means adapted to receive the stabilized gas-ozone mixture and distribute the mixture to the soil. Another embodiment may optionally include a gas conditioning means that purifies and/or pressurizes the gas prior to treatment in the ozonator. A further embodiment, may include gas neutralizing means for neutralizing residual ozone remaining in the gas after soil treatment. A final embodiment includes distribution means for advantageously applying the gas-ozone mixture to the soil. The distribution means may be designed for in situ treatment or for treatment in a chamber where the excavated soil has been placed. The distribution means for in situ treatment includes drilled wells and associated piping through which the gas-ozone mixture may be injected into the soil.

BRIEF DESCRIPTION OF THE DRAWINGS

FIG. 2 illustrates several embodiments of the invention useful in decontaminating soil.

FIG. 3 is a graph showing the destruction of an organic contaminant (phenol) according to the invention.

DETAILED DESCRIPTION OF THE INVENTION AND PREFERRED EMBODIMENT

Figure 1:
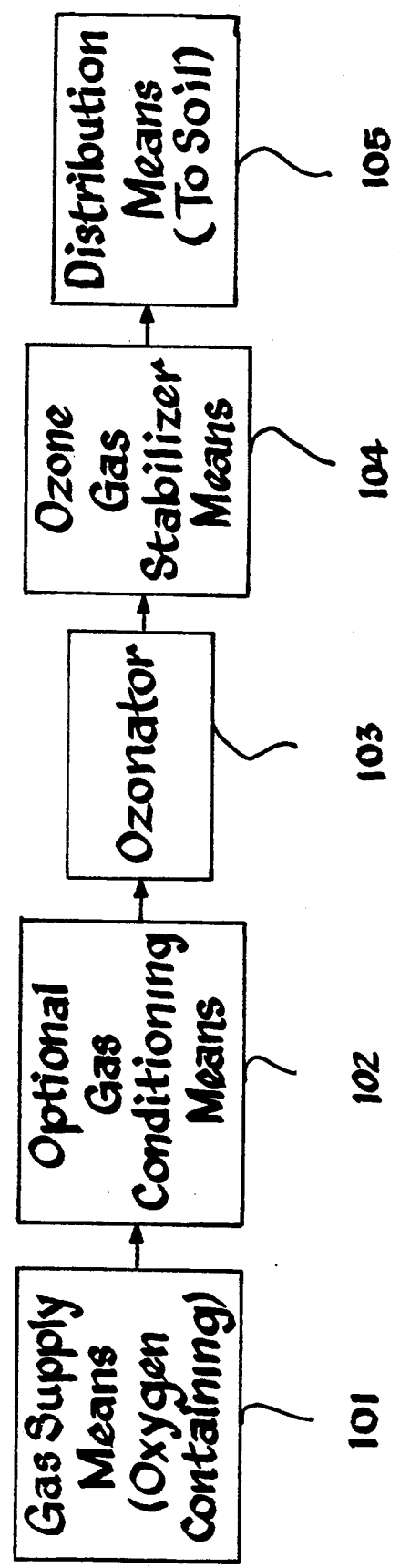
FIG. 1 illustrates in block diagram form the major steps of the invention.

The invention presented herein was discovered in the search for a soil treatment technique. First, the low stability and rapid decomposition of ozone in the soil environment was observed. Second, since ozone decomposes rapidly in soils, a method was developed to promote its stability. This method involves the pretreatment of ozone gas. Pretreatment of ozone gas is preferred to soil treatment because the former can be cost effective. Pretreated ozone was found to be capable of decontaminating soils containing hazardous organic wastes.

Referring to FIG. 1 that illustrates in block diagram form the essential steps of the invention. A source of gas, gas supply means 101, is required that contains oxygen. The gas may be from oxygen tanks, air tanks or the atmosphere. Depending on the source of the gas, the gas may need conditioning such as purification and pressurization. Purification removes constituents of the gas that may be harmful to the process or equipment. For example, if air is used moisture may need to be removed so that the ozonator 103 is not adversely affected. The gas may need to be further pressurized to provide sufficient pressure and flow at the eventual point of distribution. Pressurization ahead of the ozonation unit is preferred to avoid ozone decomposition in the process of pressurization. The use of conditioning means 102 is optional. After ozonation the gas now containing ozone is treated in stabilizer 104 to stabilize the ozone by contacting the gas with acid. Finally, the stabilized gas-ozone mixture is distributed to soil contaminated with organic pollutants by distribution means 105. Soils not saturated with water, i.e. above the saturated zone, are contemplated for treatment by the invention herein.

Referring now to FIG. 2. A source of gas, gas supply means 101, is required. The gas must contain oxygen and can be obtained from a tank 110 or the atmosphere 111. The gas flows to a conditioning means 102 via valved pipes 112, 113, and 114. On-off valving in the Drawing is designated as a circle labeled with a V. These may be arranged as needed to control gas flow. The conditioner optionally comprises a gas purifier 120 and/or a pump 121.

The gas conditioning means 102 provides gas purification and/or pressurization to the levels needed by the subsequent equipment and to provide proper flow. Gas purifier 120 removes unwanted materials from the gas (e.g., moisture and suspended matter such as dust) that would interfere with subsequent processes. Pump 121 is useful when additional gas pressure for distribution of treating gas to the soil is needed. After purification the gas flows by pipe 122 to three way valve 123 and thence to either pump 123 by pipe 124 or around the pump by pipe 125.

Thereafter, the gas flows to ozonator 103 by pipe 130. The ozonator converts a portion of the oxygen in the gas to ozone to obtain a gas-ozone mixture. The higher the oxygen concentration of the gas the greater the ozone concentration that is obtained and the faster the soil treatment. The gas used in the experiments herein was over 99.9 percent oxygen, yet resulted in only a small amount of ozone formed as discussed later. A high ozone concentration is preferred; however, economics may dictate that air be the starting material rather than oxygen.

The gas-ozone mixture flows from ozonator 103 by pipe 131 to the ozone stabilizer means 104. The stabilizer means 104 may comprise a container with a spray system or a like device that can contact acid with the gas-ozone mixture in a manner to stabilize the mixture. Alternatively, bubbling the gas-ozone mixture through acid is another way to contact the acid. FIG. 2 shows the actual embodiment used in the tests for the stabilizer 104. The embodiment comprises an isolation container 140 coupled to an acid container 142 by pipe 141. The acid container 142 is then coupled to another isolation container 144 by pipe 143. The function of the isolation containers 140, 144 is to prevent acid from spilling into pipe 131 or pipe 149. Acid 146 in container 142 may be any acid capable of stabilizing the ozone to an acceptable level. Presently the preferred acid useful in this invention is nitric acid because of its relatively high vapor pressure. Other strong acids such as sulfuric and hydrochloric may be used as long as they do not produce harmful by-products after reacting with organics in soils. Whether diluted (with water) or undiluted the acids must be present at a concentration that provides sufficient protons for ozone stabilization. The concentration is generally sufficient at a pH of about one (1) or less. Strong inorganic acids are preferred.

The term stabilized gas-ozone mixture includes an oxygen-ozone mixture, air-ozone mixture, and ozone mixed with other gases that are expeditious in the method of the present invention and have been treated by contact with an acid so as to increase the stability of the ozone in the gas when contacted with soil.

After stabilization in stabilizer 104 the stabilized gas-ozone mixture flows by pipe 149 to distribution means 105. The distribution means includes piping 151 that delivers the gas-ozone mixture to the soil in situ where it is further distributed by wells (not shown). Alternatively the gas-ozone mixture flows by pipe 152 into pipes 153, 153A and then to one or both chambers 156, 156A, respectively that contain contaminated soil 154. Three way valve 150 may be used to discharge the off gas to the proper pipe 151, 152 from pipe 149.

After passing through the soil in situ the stabilized gas-ozone mixture is depleted completely or partially in ozone content. The gas may remain totally or partially in the soil with no adverse effects as any excess ozone will completely decompose in a few days or less. Any ozone remaining in the gas-ozone mixture that reaches the surface of the soil and discharges to the atmosphere may be discharged as such or treated by ozone neutralizer means (not shown). One method of neutralization includes the spreading of an ozone neutralizer over the soil. This is further discussed below.

After passing through contaminated soil 154 in chambers 156, 156A the gas-ozone mixture may also be partially or completely depleted of ozone. Pipes 157, 157A carry gas from the chambers to outlet pipe 163 from which the gas may be vented directly to atmosphere through valved pipe 159. If needed the gas can be piped to neutralizer means 164 by pipe 163. Neutralizer means 164 neutralizes residual ozone in the gas prior to discharge to atmosphere at pipe 165. The neutralizer means 164 may comprise an ozone quenching material such as $Na_2S_2O_3$ in a tank through which a gas-ozone mixture is passed or as a blanket when soil is treated in situ as further discussed below. Analyzer 162 may be used to analyze the gas for ozone content through pipe 161. The design of analyzer 162 is not critical and may be any known apparatus for determining ozone levels as for example the use of KI solutions.

EXAMPLE 1

The stability of ozone in a soil environment was tested using a continuous-flow column apparatus similar to that of FIG. 2 (columns 156, 156A) except that an acidification unit (stabilizer means 104) for treatment of ozone was not used. Shallow subsurface soil samples from 6 to 18 inches deep were obtained from a location at West Jefferson, Ohio and used in the column tests. The soil type obtained was Crosby Silt-Loam. The characteristics are:
pH: 6.4 to 6.7
cation exchange capacity: 8 to 10 meq/100 g
organic matter content: 2 to 3 percent Ozone was generated by passing pure oxygen (10 psi-gauge and 5 ft$^3$/hr) through an ozonator (Purification Science, Inc., Model LOA2). These conditions were maintained through all the experiments conducted in the present study. Concentration of ozone in the gas stream (ozone/oxygen mixture) was measured by trapping the ozone in potassium iodide (KI) solutions and titrating the liberated iodine with sodium thiosulfate ($Na_2S_2O_3$); American Public Health Association, 1985, Standard Methods DC. The average ozone concentration in the gas stream is 11.1 mg($O_3$)/g($O_2$) with a relative standard deviation of ± 5 percent.

During these experiments, the ozone/oxygen mixture was passed through a soil column continuously for one hour. The column was about 6 cm deep and 4 cm in diameter for Examples 1, 2, 3, and 4. Gas leaving the column was analyzed for ozone content every ten minutes. The results presented in Table I indicate that the ozone concentration in the ozone/oxygen mixture leaving the soil column (i.e. soil column off-gas) increased during the first 20 minutes and gradually decreased during the subsequent 40 minutes.

TABLE I

Effects of Continuous Ozonation for One Hour on Off-gas Ozone Concentration.

| Ozonation Time Minute | Off-gas Ozone Level mg($O_3$)/g($O_2$)$^a$ |
|---|---|
| 10 | 2.7 |
| 20 | 3.3 |
| 30 | 2.9 |
| 40 | 2.4 |
| 50 | 1.1 |
| 60 | 0.77 |

$^a$Each value is an average of two analyses.

EXAMPLE 2

Results of Example 1 show that the ozonation period may be inadequate to establish the steady state conditions. Consequently, another test was conducted to see how long it will take to reach the steady state and the corresponding steady state ozone concentration in off-gas stream. The results of these experiments are presented in Table II. The steady state ozone level approached to undetectable levels after three hours of continuous ozonation.

TABLE II

Steady State Time-Concentration Data for Continuous Ozonation.

| Ozonation Time Minute | Off-gas Ozone Level mg($O_3$)/g($O_2$)$^a$ |
|---|---|
| 15 | 5.3 |
| 30 | 4.6 |
| 45 | 2.1 |
| 60 | 1.2 |
| 75 | 1.0 |
| 90 | 0.56 |
| 105 | 0.5 |
| 120 | 0.34 |
| 180 | ND$^b$ |

$^a$Results reported are average of two values.
$^b$Not detected.

EXAMPLE 3

Another set of experiments were conducted to investigate whether intermittent ozonation (e.g. ozonation for a few minutes, leaving the column without ozonation for some time and so forth) could improve the off-gas ozone levels. Results presented in Table III show that such intermittent treatment would not maintain high ozone levels in the soil column off-gas.

TABLE III

Effects of Intermittent Ozonation on Off-gas Ozone Level.

| Treatment Type | Treatment Time, Min. | Elapsed Time, Min. | Off-gas Ozone Level mg($O_3$)/g($O_2$)$^a$ |
|---|---|---|---|
| Ozonation | 40 | 40 | 0.07 |
| Oxygenation | 5 | 45 | NA$^b$ |
| No treatment | 60 | 105 | NA |
| Ozonation | 5 | 110 | 0.2 |
| Ozonation | 10 | 120 | 0.14 |
| Oxygenation | 5 | 125 | NA |
| No treatment | 60 | 185 | NA |
| Ozonation | 5 | 190 | 0.36 |
| Ozonation | 25 | 215 | 0.11 |

$^a$Each reported value is average of 2 analyses.
$^b$Not analyzed (NA).

Results from Examples 1, 2 and 3 indicate that soil ozonation by-products either exert increasing ozone demand or act as ozone-decomposing catalysts. Since the extended or intermittent ozonation did not result in higher ozone levels in soil column off-gas, it appears that ozone scavengers are formed during the soil ozonation process. Thus, long-term treatment of soils to remove contaminants with untreated ozone is not feasible since the ozone decomposes too rapidly. The off-gas ozone levels further indicate that ozone penetration of soils is not adequate to assure decomposition of contaminants more than a short distance from the point of application.

EXAMPLE 4

If ozone scavengers are formed during the treatment process, their effects may be reduced by pretreatment of soils or pretreatment of the ozone gas stream. In this example, ozone gas was pretreated by passing it through a 5 percent $HNO_3$ solution (pH=about 0.1). The same soil sample used in Example 3 was treated for 45 minutes using acidified ozone. This soil sample was selected assuming that it would give the greatest amount of decomposition since it had been treated with ozone previously. The results are presented in Table IV. Acidification of the gas stream increased the stability of ozone so that ozone levels soil column off-gas increased with time.

TABLE IV

Effect of Gas Stream Acidification on Off-gas Ozone Levels in Small Soil Columns.

| Treatment Period (min) | Soil Column Off-gas Ozone Levels[a] $mg(O_3)/g(O_2)$ |
| --- | --- |
| 0 | 0.11 |
| 15 | 0.56 |
| 45 | 6.5 |

[a]Average of 2 samples.

An increase in the stability of ozone ($O_3$) in a soil environment can be explained by two hypotheses: (i) the introduction of protons to soils can reduce the formation of radical scavengers, and/or (ii) the formation of protonated ozone ($O_3H^+$) which is a more stable species than $O_3$. These mechanisms are explained below.

Reaction of ozone with metal species in soils results in the formation of metal oxides. Some metal oxides can readily form their bases in the presence of moisture. The hydroxide ions ($OH^-$) generated during this process greatly accelerate the decomposition of ozone. Highly reactive secondary oxidants, such as OH. radicals, are thereby formed. These radicals and their reaction products further increase the decomposition of ozone; Hoigne, J., and Bader, H., 1976, The Role of Hydroxyl Radical Reactions in Ozonation Processes in Aqueous Solutions, Water Research, Vol. 10, pp. 377-386. In the present invention, addition of protons to the ozone stream preferentially reduced the formation and/or concentration of $OH^-$ in the soil environment. Consequently, formation of OH. will also be reduced. The net effect of all these reaction paths is to minimize the rate of ozone decomposition in soils.

Although not wishing to be bound by any theory, it is presently believed that the mechanism of action is that, by acidifying ozone, an intermediate species of the formula $O_3H^+$, which is known as protonated ozone, is formed. Perhaps, protonation promotes the stability of cyclic ozone. The role of protonated ozone in acid-catalyzed oxygenation of alkanes with ozone in aqueous media has been explained in an article by Yoneda and Olah; Yoneda, N., and Olah, G. A., 1977, Oxyfunctionalization of Hydrocarbons, 7[1a] Oxygenation of 2,2 - Dimethylpropane and 2,2,3,3-Tetramethylbutane with Ozone or Hydrogen Peroxide in Superacid Media, Journal of the American Chemical Society, Vol. 99(9) pp. 3113-3119; as an electrophilic insertion of $O_3H^+$ to form a hydrocarbon-$O_3H^+$ complex. In another article by Kausch and Schleyer; Kausch, M., and P. R. Schleyer, 1980, Isomeric Structures of Protonated Ozone: A Theoretical Study, Journal of Computational Chemistry, Vol. 1(1) pp. 94-98; molecular orbital calculations were used to determine the structure of protonated ozone and four stable minima were found on the $O_3H^+$ singlet potential energy surface. All four forms of protonated ozone are stable with respect to dissociation into $O_3$ and $H^+$. Whatever the mechanism, the advantages of the present invention are obtained by the method herein where a gas-ozone mixture is passed through an acid prior to application to soil.

EXAMPLE 5

In the experiments conducted so far (Examples 1, 2, 3, and 4) the amount of soil used was only 300 g. Protonation of the ozone gas stream appeared to leave high levels of residual ozone (60 percent of incoming ozone) after passing through 300 g of soil for 45 minutes. In order to test the effectiveness of protonation to treat large quantities of soil, further experiments were conducted using larger soil samples (up to 900 g).

The experimental setup was modified to include two larger soil columns (6 cm in diameter and 40 cm in height) and a gas washing bottle containing 5 percent $HNO_3$ in the ozone influent line to the columns. The test unit is shown in FIG. 1. A continuous flow ozonation experiment was conducted using 900 g of soil for 3 hour periods. The soil column off-gas was analyzed at 1, 2, and 3 hour time intervals.

When the ozone gas stream was first bubbled through an acid solution, higher ozone concentrations in the soil column off-gas were observed during the three hour ozonation period (see Table V). The data also indicate that ozone concentrations were increasing gradually over the three hour period. In order to achieve 6.6 mg ($O_3$)/g($O_2$) in off-gas stream, it took about three hours for 900 g of soils whereas the off-gas ozone level approached the same value in 45 minutes when the soil sample was only 300 g (c.f. Tables IV and V).

TABLE V

Effect of Gas Stream Acidification on Off-gas Ozone Levels in Large Soil Columns.

| Treatment Period (hr) | Soil Column Off-Gas Ozone Levels at the End of Treatment Period (mg ($O_3$)/g($O_2$))[a] |
| --- | --- |
| 1 | 1.8 |
| 2 | 3.5 |
| 3 | 6.6 |

[a]Average of 2 samples

EXAMPLE 6

The preliminary investigations indicated ozone in a gas-ozone mixture, that was not subjected to acidification, was very unstable in soil environment. Ozone decomposed rapidly and the residual leaving a column with 300 g of soil decreased gradually (see Examples 1 through 3). Therefore, ozone that was not acidified was not expected to be useful especially for the treatment of larger quantities of soils. Thus, the soil decontamination studies were conducted using acidified ozone which was more stable than untreated ozone.

A final set of tests involved ozone treatment of soils contaminated with phenol and 1,2,4-trichlorobenzene. Approximately 330 mg of phenol was dissolved in 300 ml of acetone and thoroughly mixed with 1.5 kg of silt-loam soils to yield an approximate concentration of 200 ppm of phenol in soil. The soil sample was air dried to remove acetone by volatilization. Each glass column was packed with 740 g of phenol contaminated soil. The compacted soil column was 21 cm high. One column was used in the ozonation experiment and the other was used as a control where pure oxygen was used in place of the oxygen-ozone mixture. The soils were treated with the respective gases and soil samples were removed after 5, 15, 30, and 60 minutes from the initiation of the experiments. Each sample was removed from upper 3 to 4 cm of the soil column and weighed approximately 10 g. Soil was sampled from the uppermost layers since the decontamination is expected to be lowest in this zone. All the soil samples, including one without phenol, were mixed with 30 ml of 90 percent methanol for phenol extraction. Phenol extracts were analyzed using high performance liquid chromatography (HPLC). This method is known to have a good linearity in the range from 100 ppb to 100 ppm.

A stabilized oxygen-ozone mixture appears to be very effective in removing phenol from soils. FIG. 3 generated from the chromatograms shows that the passage of oxygen without ozone through the soil column (control experiments) did not result in a significant reduction of phenol levels. In contrast, soils treated with the stabilized gas-ozone mixture had very low levels of phenol left after one hour of treatment. Removal of phenol by ozone at the uppermost soil layer where the decontamination is expected to be the lowest was about 97 percent in one hour.

Stabilized ozone also was found to be effective for decontamination of soils containing halogenated organic compounds such as 1,2,4-trichlorobenzene (TCB). In this set of experiments, a 30-cm soil column was used. The TCB concentration in ozonated column was reduced by 67 percent during 1.5 hour treatment. The fraction of TCB removal is low as compared to phenol. Comparatively low TCB destruction can be attributed to its low reaction rate constant. The other reason could be that the TCB soil column is larger than the phenol soil column.

The variation of soil column decontamination at different depths was also examined. After treatment with protonated ozone for 1.5 hours, the TCB levels were decreased by 84, 92 and 93 percent, respectively, at depths of 5, 12 and 19 cm. These results show that the decontamination efficiency gradually decreased with the increase in the distance from the source of ozonation.

Ozone, in the aqueous phase, reacts with a large number of organic compounds. Some of these compounds include aromatics in general (e.g. benzene and hologenated benzenes, toluene, xylene, anisole, phenol, chlorophenols, and naphthalene), some unsaturated aliphatics (e.g., ethylene, halogenated ethylenes, fumeric acid, and styrene), some substituted alkanes (e.g., ethanol, butanol, cyclopentanol, and acetaldehyde), and other compounds such as chloroform, bromoform, methylene chloride, and dioxane; Hoigne, J. and Bader, H., 1983, Rate Constants of Reactions of Ozone with Organic and Inorganic Compounds - I and II, Water Research, Vol, 17, pp. 173-183 and 185-194. Ozone prepared with the method of the present invention will similarly react with the cited compounds.

The following discussion applies to field applications of the protonated ozone. Protonated ozone is to be applied to soils contaminated by accidents or intentional release of hazardous organic compounds. Some examples of unintentional releases or accidents include spills and leaks from underground storage tanks, pipelines, tank car derailments, etc. Intentional releases include field application of pesticides or herbicides and land disposal of hazardous organic wastes. For most applications in situ treatment is preferred over treatments requiring excavation. The advantage of in situ treatment, when compared with other on or off site treatment, is that soil does not have to be excavated, transported, or refilled. The in situ ozone treatment involves injecting of a stabilized gas-ozone mixture at pressures above atmospheric pressure into one or more injection wells in contaminated areas. The distribution of the well bank is to be determined by the effective ozonation zone in the subsurface. The effective ozonation zone depends on the ozone concentration in the gas stream, pressure, flow rate, reactivity of the chemical with ozone, and soil properties such as permeability, porosity, and organic matter content. Once knowing the teachings of the invention this can readily be determined by those skilled in the art. If desired, ozone that could be released to the atmosphere during this process can be trapped by using an ozone neutralizing material such as sodium thiosulfate ($Na_2S_2O_3$) or the like. One of the possible neutralizing means is the use of a spread blanket wetted with $Na_2S_2O_3$ solution over the ozonation zone. If the release of volatile organic matter is possible as a result of stripping action, those compounds will be retained by a layer of activated carbon lying on top of the $Na_2S_2O_3$ wetted blanket. After the decontamination process, if the soil is found to be too acidic, the pH may be increased to a required level by applying unacidified gas-ozone mixture for some time.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

I claim:

1. An apparatus for treating soil contaminated with organic compounds comprising:
   a. an ozone generator adapted to receive an oxygen containing gas from a gas supply means, that generates ozone from oxygen in the gas to produce a gas-ozone mixture;
   b. ozone stabilizing means, containing an acid, connected to the ozone generator by a first pipe for receiving the gas-ozone mixture from the ozone generator, that stabilizes the gas-ozone mixture by contacting the mixture with the acid to produce a stabilized gas-ozone mixture, wherein the acid has a pH of about one (1) or less; and
   c. gas-ozone mixture distribution means, connected to the ozone stabilizing means by a second pipe for receiving the stabilized gas-ozone mixture, that distributes the mixture to the soil as a gas.

2. The apparatus of claim 1 further comprising gas supply means connected to the ozone generator by a third pipe for supplying a gas containing oxygen to the ozone generator.

3. The apparatus of claim 2 further comprising gas conditioning means adapted to purify and/or pressurize the gas, disposed between the gas supply means and ozone generator, wherein the third pipe connects the gas supply means to the gas conditioning means for supplying a gas containing oxygen thereto, and a fourth pipe connects the gas conditioning means to the ozone generator for supplying a conditioned gas containing oxygen thereto.

4. The apparatus of claim 1 wherein the gas-ozone mixture distribution means further comprises injection wells for treating the soil in situ and fifth piping for distributing the gas-ozone mixture to the wells.

5. The apparatus of claim 4 further comprising:
   d. ozone neutralizing means adapted to receive the gas-ozone mixture that has passed through the soil and neutralize the residual ozone in the mixture, wherein the ozone neutralizing means is a spread blanket wetted with $Na_2S_2O_3$ solution over an ozonation zone.

6. The apparatus of claim 1 wherein the gas-ozone mixture distribution means further comprises one or more chambers for treating the soil and sixth piping for distributing the gas-ozone mixture to the chamber(s).

7. The apparatus of claim 6 further comprising:
d. ozone neutralizing means adapted to receive the gas-ozone mixture that has passed through the soil and neutralize the residual ozone in the mixture, wherein a seventh pipe connects an outlet of each chamber to the ozone neutralizer means and neutralized gas is discharged to atmosphere from the ozone neutralizer means.

8. The apparatus of claim 1, wherein the ozone stabilizing means comprises a container with acid, and the gas-ozone mixture from the first pipe is bubbled through the acid to contact and stabilize the gas-ozone mixture, and the stabilized gas-ozone mixture flows to the distribution means by the second pipe.

9. The apparatus of claim 1, wherein the ozone stabilizing means comprises a spray system for contacting the gas-ozone mixture from the first pipe and the stabilized gas-ozone mixture flows to the distribution means by the second pipe.

10. The apparatus of claim 1, wherein the acid is a strong inorganic acid.

11. The apparatus of claim 10, wherein the acid is selected from the group consisting of nitric acid, sulfuric acid, hydrochloric acid and mixtures thereof.

* * * * *